James K. Mosher,
INVENTOR.
WHANN & McMANIGAL
Attorneys for Applicant

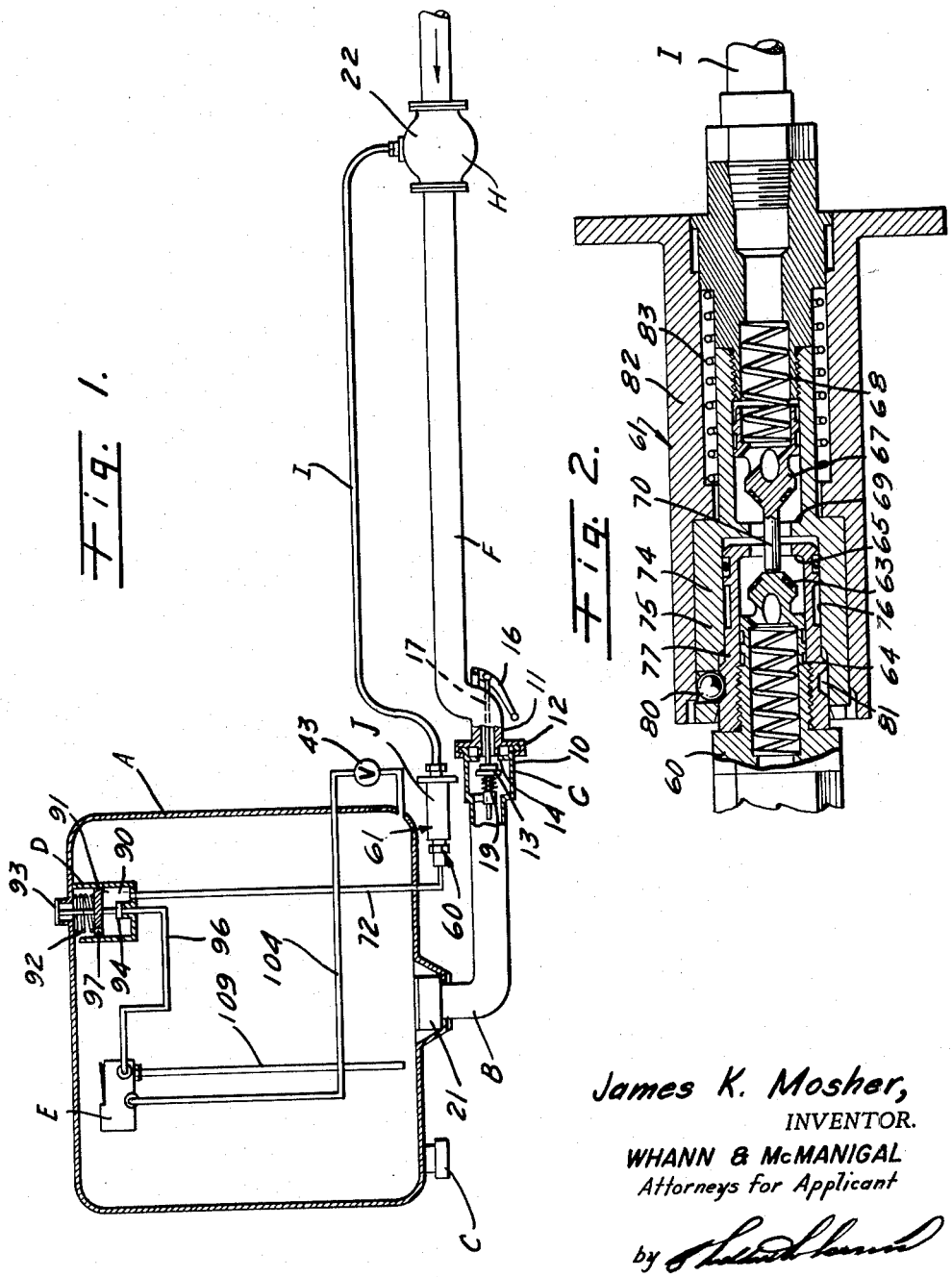

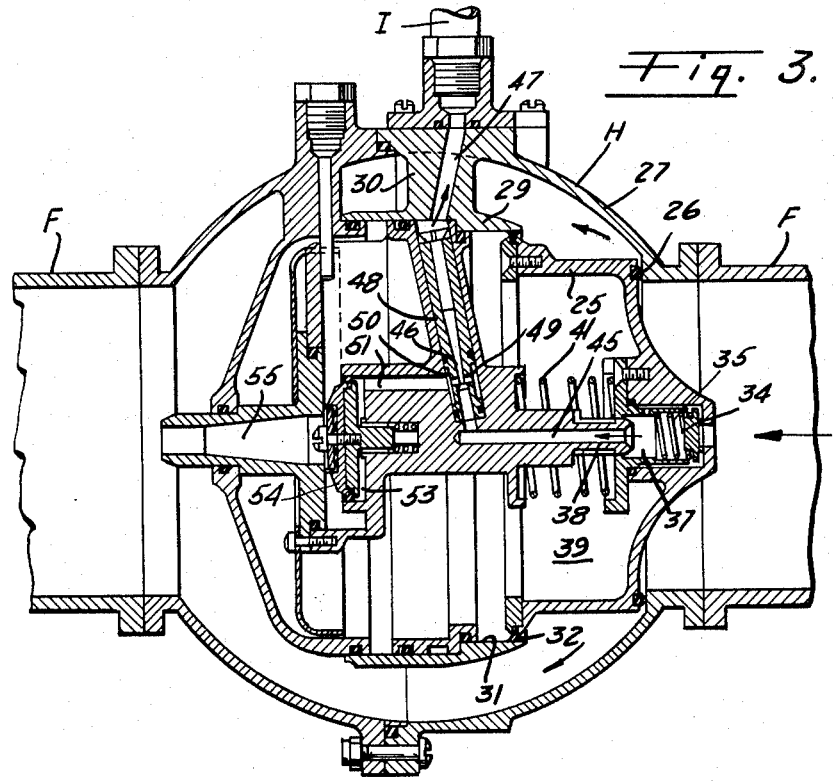
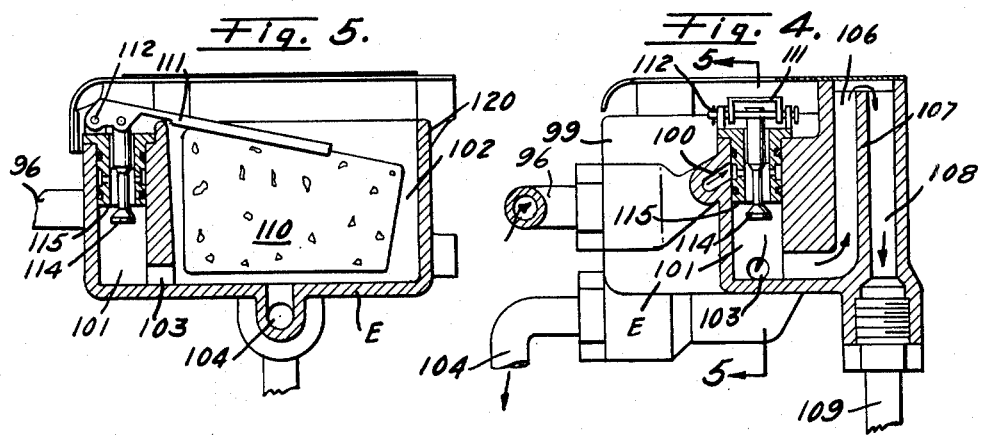

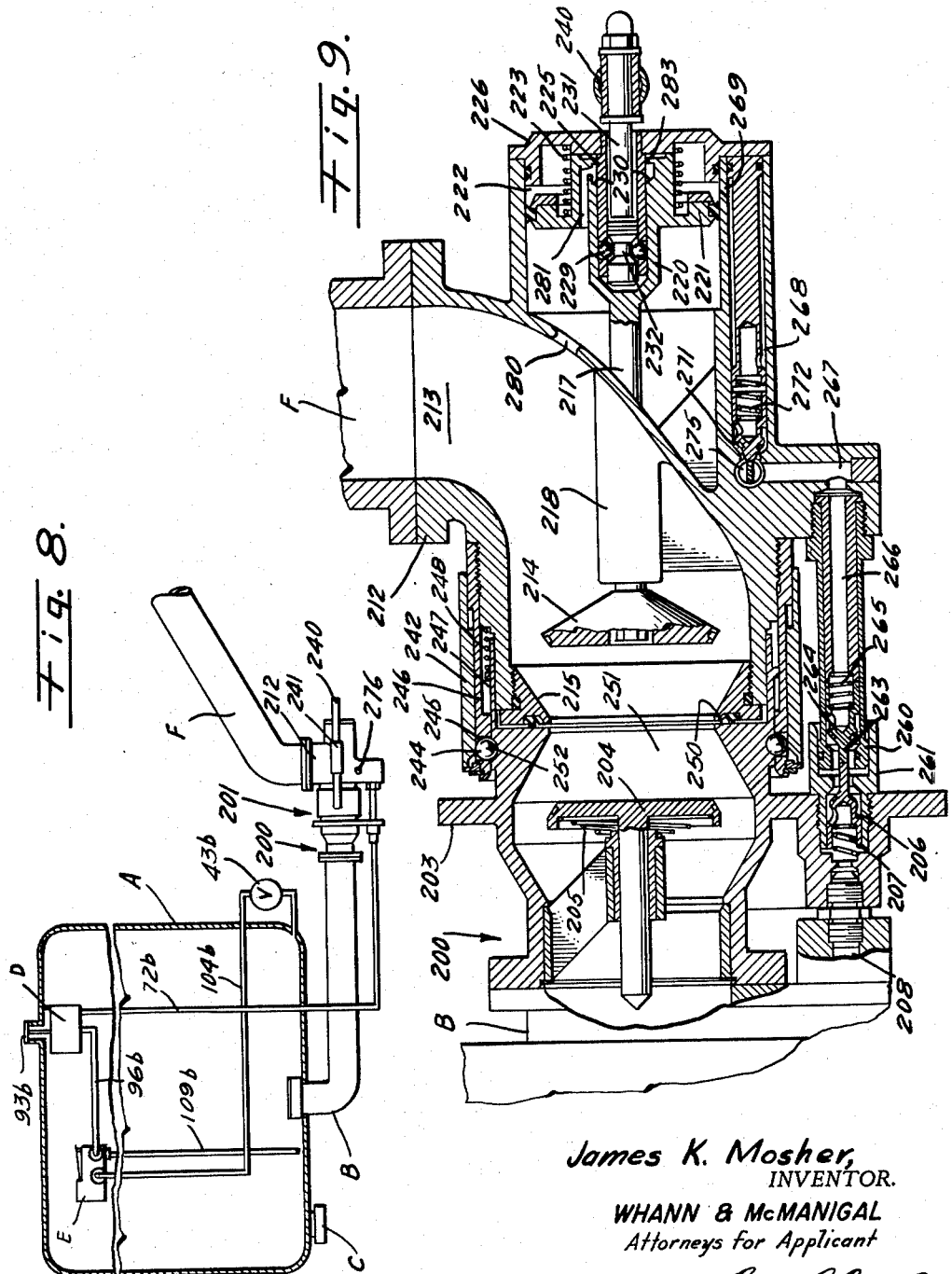

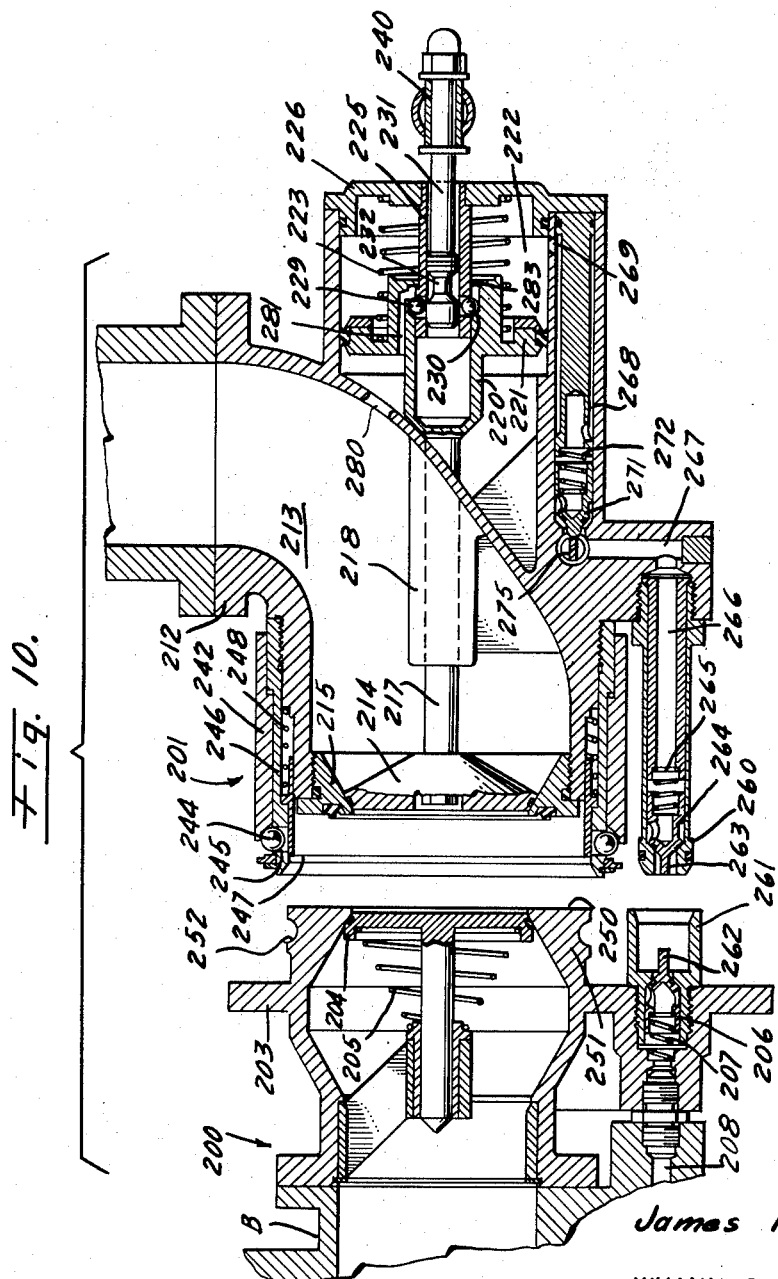

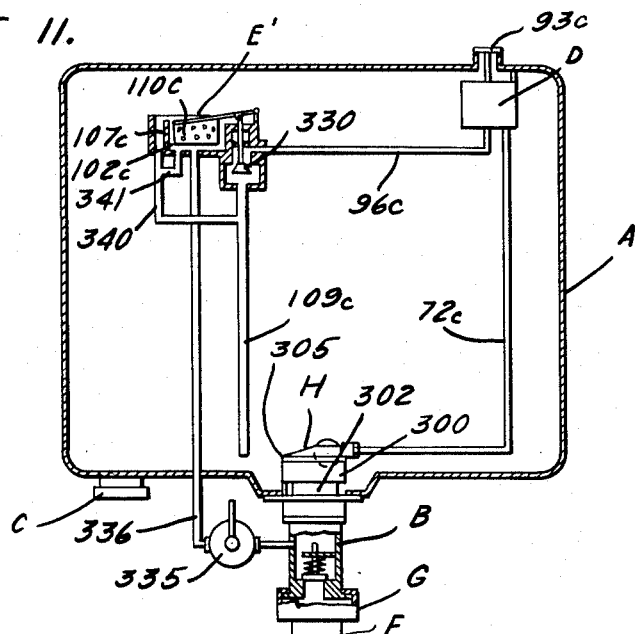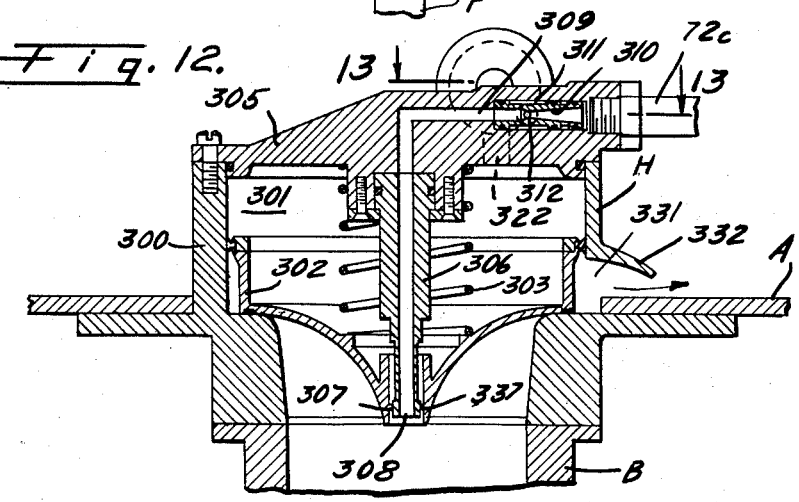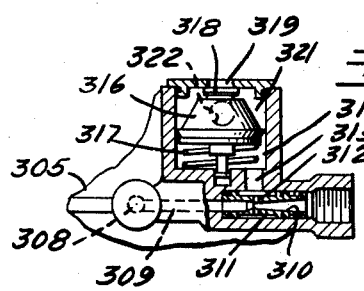

United States Patent Office 3,144,056
Patented Aug. 11, 1964

3,144,056
APPARATUS FOR LOADING AND UNLOADING
A FUEL TANK
James K. Mosher, Pasadena, Calif., assignor to Schulz
Tool and Manufacturing Co., San Gabriel, Calif., a
corporation of California
Filed Feb. 2, 1960, Ser. No. 6,277
10 Claims. (Cl. 141—192)

My invention relates to method and apparatus for loading and unloading liquids such as fuel from tanks or other receptacles.

It is an object of my invention to provide method and apparatus for filling and emptying large fuel tanks such, for example, as are mounted on fuel trucks, which provides for filling and emptying from the bottom of the tank and in which various valves and safety controls are automatically operated.

It is an object of my invention to provide method and apparatus for filling and emptying large fuel tanks in which the pressure of the fuel is employed as a power source for operating the various elements of the system.

It is an object of my invention to provide method and apparatus of the character described in which after connecting the filling apparatus to the tank to be filled, it is possible to precheck the operation of all of the elements of the system.

It is a still further object of my invention to provide method and apparatus of the character described in which the main closing valve is automatically closed upon reaching the proper fuel level in the tank.

It is also an object of my invention to provide method and apparatus of the character described in which a vent is automatically opened during the filling operation and automatically closed when the filling operation has been completed.

It is another object of my invention to provide method and apparatus of the character described in which there can be no accidental opening or operation of the system until all of the parts are properly connected together in proper operating position.

It is an object of my invention to provide such a method and apparatus in which the filling operation is automatically performed, the upper end of the tank is not exposed to contamination, there is no affluent fuel discharged above the main body of fuel thus eliminating creation of static electrical charges which present explosion hazards and in which there is no need to have personnel located in any hazardous positions during the filling operation or during the emptying operation.

For the purpose of illustrating my invention I have chosen four embodiments which are shown and described in the accompanying drawings and which will now be referred to for the purpose of describing the construction and operation and presenting further features and objects of my invention.

Referring to the drawings:

FIG. 1 is a diagrammatic view illustrating a system incorporating the features of my invention;

FIG. 2 is a fragmentary sectional view of a control line connector;

FIG. 3 is a sectional view through a main valve;

FIG. 4 is an end view partly in section showing a precheck and automatic shut off device;

FIG. 5 is a sectional view taken as indicated by the line 5—5 of FIG. 4;

FIG. 8 is a diagrammatic view of a third form of my invention;

FIG. 9 is a fragmentary sectional view through the fueling nozzle which comprises a part of the form of my invention shown in FIG. 8, the parts being in the position they occupy when fuel is being supplied to the tank;

FIG. 10 is a fragmentary sectional view showing the fueling nozzle in disconnected position;

FIG. 11 is a diagrammatic view showing a fourth form of my invention;

FIG. 12 is a sectional view taken through the bottom loading valve arrangement; and FIG. 13 is a fragmentary sectional view taken on the line 13—13 of FIG. 12.

Figure 6:
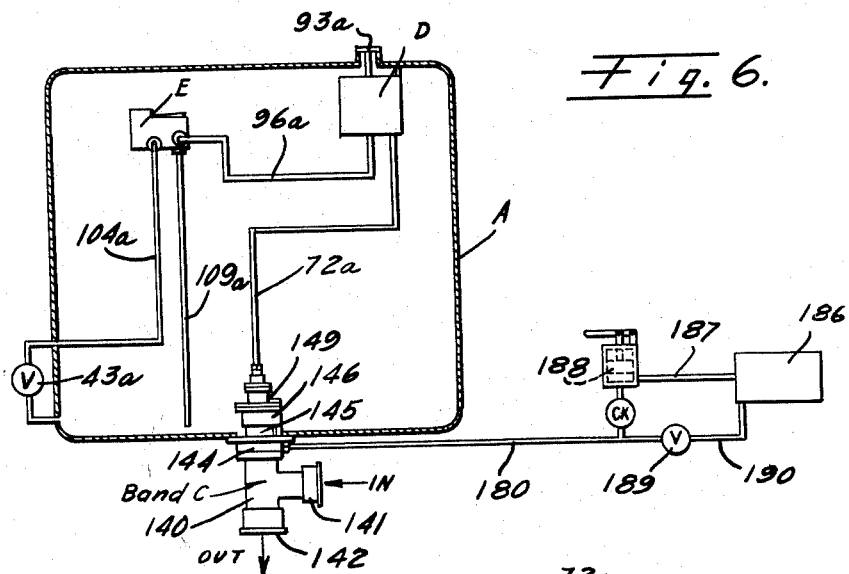
FIG. 6 is a diagrammatic view of a second form of my invention.

Referring to the drawings and particularly FIG. 1 of the views illustrating the first form of my invention, A is a tank which is representative of any storage container in which a liquid is to be stored. The invention is particularly useful in connection with the loading and unloading of aircraft or other explosive fuels, although as diagrammatically shown, the tank A may be representative of a tank on a fuel truck.

Tank A has an inlet B and an outlet C. In the upper portion of the tank is a vent D which is automatically operable to vent off gases during the filling operation. Positioned in the tank A and connected to the operating parts as will be explained later is a precheck and automatic shut off device E.

The filling station equipment adapted to be operatively connected to the tank equipment during filling operations includes a supply line F through which the fuel is supplied to the inlet B and delivered to the tank. The supply line F is connected to the inlet B by a connection fitting G; and positioned in the supply line F is a main valve H. Extending from the main valve H is a control line I which may be connected to the fueling system of the tank A by means of a connector J.

The connection fitting G is of a standard design and includes elements 10 and 11 disconnectibly joined together at 12 and including a valve 13 which may seat on the flange 14 for closing the inlet B. A manually operable lever 16 when moved from left to right will move the rod 17 moving the valve 13 between opened and closed positions, there being a spring 19 which normally holds the valve 13 in a closed position when the parts 10 and 11 are separated from each other. As an additional safety factor, the inner end of the inlet B may be provided with a check valve 21 which prevents a reverse flow therethrough.

The main valve H shown in detail in FIG. 3 includes a main valve 25 adapted to engage a seat 26 in valve body 27 for closing the supply line F. Within the body 27 is an inner shell 29 supported through one or more arms or webs 30 and consisting of a plurality of parts connected together with proper seals as illustrated. The member 29 has a bore 31 which receives the cylindrical body portion of the valve 25, the valve 25 being axially movable relative to the bore 31 and being sealed therewith by a suitable annular seal member 32.

Pressure in the supply line F on the pressure side or right side of the valve H as shown in FIG. 3 will force the closure 34 from its seat against the action of the spring 35 and thus fuel under pressure will flow through the passage 37 around the central sleeve 38 into the chamber 39. Since the area of the valve 29 exposed to pressure in the chamber 39 is greater than the area exposed to pressure in the supply line F the valve 25 will be pressurally held in seated position. The spring 41 is provided to normally seat the valve 25 when there is no pressure in the supply line.

When it is desired to open the valve member 25, the fuel is allowed to flow through the line I by opening the control valve 43 as will be explained later. When liquid flows through the control line I, it flows through a path as will now be explained in connection with FIG. 3. The sleeve 38 has a central passage 45 which extends through an aspirator 46 and is connected to the passage 47 in the arm or strut 30. The aspirator 46 includes a sleeve 48 which has openings 49 connected to an outer space 50 which outer space 50 is connected to the passage 51. The function of the aspirator, when liquid is flowing through the control line I is to produce a reduction in pressure in the passage 51 which reduces the pressure in the valve chamber 53 and permits the valve 54 to move in a rightward direction from its seat thus opening the outlet passage 55 and thus permitting the pressure in the chamber 39 to reduce to down-stream pressure. This will cause an unbalance in pressure which will move the valve 25 from closed position to open position. So long as liquid is flowing through the control line I the aspirator functions to maintain the valve 54 in an open position which will in turn cause pressure differences which will maintain the control valve or main valve 25 in open position.

The liquid flowing through the line I passes to the connector J which is illustrated in FIG. 2. The connector J consists of two parts, part 60 which comprises a portion of the tank assembly A and part 61 which is a portion of the filling station equipment. Part 60 has a valve 63 normally urged by a spring 64 against a seat 65 and in this way the opening is closed. The removable portion 61 has a valve 67 normally held by a spring 68 against a seat 69. When the two parts are brought together a stem 70 on the valve 67 engages the valve 63 and both valves are moved into the positions shown in FIG. 2 in order that the passage from the control line I to the line 72 is joined through the part 60 of the connector. The part 61 has a body 74 which forms the seat 69 and the cavity for receiving the valve 67 and spring 68. The body 74 also has a tubular extension 75 providing a socket 76 for receiving the male element body portion 77 of the part 60. For locking the part 77 to the part 74 there is a series of balls 80 held into the annular recess 81 of the portion 77 by the sleeve 82 which is retractable against the action of the spring 83 to release the balls 80 and permit the parts 60 and 61 to be separated.

The line 72 is connected to a chamber 90 of the vent D. The chamber 90 carries a piston 91 which when there is pressure in the chamber 90 is moved upward against the action of the spring 92 and the vent valve 93 is opened. Also, when the piston 91 is pressurally moved upward, a valve 94 is unseated so that it connects the line 96 to the chamber 90 thus permitting liquid to flow from the line 72 into the chamber 90 and from the chamber 90 into the line 96. A small bleed opening 97 is formed in the piston 91 to permit balancing of pressures on opposite sides of the piston 91 when the filling operation is not being performed.

The line 96 is extended to the precheck and automatic shut offs shown in detail in FIGS. 4 and 5. Line 96 is connected to the body 99 and delivers liquid under pressure to the passage 100 which is connected to a chamber 101, the chamber 101 being connected to the float chamber 102 through a passage or series of passages 103. The bottom of the chamber 102 is connected to a line 104 which, as shown in FIG. 1, extends to the exterior of the tank A, includes the shut off or control valve 43, and the line 104 is connected to empty into the bottom of the tank A.

When the valve 43 is open, the liquid will flow from the control line I through the line 72 into the chamber 90 and exert a pressure against the piston 91 to open the vent 93. Upon opening of the valve 94, the liquid flows through the line 96, the passage 100, chamber 101 and passage 103 into the float chamber 102. The liquid then flows outwardly from the bottom of the float chamber through the line 104 and to the bottom of the tank. If it is desired to determine whether or not the parts of the filling or loading mechanism are in operation, the valve 43 is closed. This prevents the flow of liquid from the float chamber 102 and this chamber will, therefore, fill with liquid. Any overflow of liquid will pass through the passage 106 over the rear wall 107 into the outlet passage 108. The outlet passage 108 is connected to a line 109 which extends to the bottom of the tank. By reason of this arrangement, there will be no splashing or cascading of volatile liquids in the tank.

As the float chamber fills with liquid, the float 110 connected to arm 111 and pivoted at 112 is moved upwardly. This will lift a valve 114 and finally bring the valve against a seat 115 and completely close the passage 100. This will stop the flow of liquid through the system except for the negligible amount which may bleed through the bleed opening 97. When this occurs, the flow of liquid through the passage 45 will be reduced to a minimum and the aspirator effect at the aspirator 46 will be eliminated and pressure will be built up in the chamber 53 behind the piston 54 and the piston 54 will move toward a closed position. The liquid, since it is flowing into the chamber 39 around the sleeve 38, will build up a pressure in the chamber 39 and the valve 25 will move into a closed position. The slow leakage through the bleed 97 will allow the vent 93 to close. In this manner, it is possible to check the operation of the system at any time during the filling operation to be sure that when the tank is filled to the proper level that the filling mechanism will be automatically shut off by the closing of the valve 25.

At the completion of this precheck, the valve 43 is opened whereupon the flow of liquid will be re-established through the precheck system and the valve 25 will be opened so that the fuel may be fed into the lower end of the tank A through the inlet B.

When the fuel level rises to such a point that the fuel will flow over the upper edge of the walls 120 defining the float chamber 102 the float chamber will be filled; the float 110 will be raised to close the valve 114 which will result in the valve 25 being moved to closed position. With the tank properly filled the handle 16 may be moved to the right to cause rightward movement of the rod 17 and a closing of the valve 13 against the seat 14. Also, the retractable sleeve 82 may be moved in a rightward direction to permit the balls 80 to move outwardly from the annular groove 81 at which time the part 61 may be separated from the part 60 of the connecting fitting J. When this is done, the valves 63 and 67 will automatically close due to the action of the springs 64 and 68 and this will reduce spillage to a minimum. With liquid bleeding through the bleed opening 97 to provide equalization of pressure on opposite sides of the piston 91, the vent 93 will automatically close.

From the foregoing it will be seen that the form of my invention described embodies the features and advantages pointed out in the introductory portion of this specification. When it is desired to unload the fuel from the tank A this may be done through suitable valving connections to the outlet C.

Figure 7:
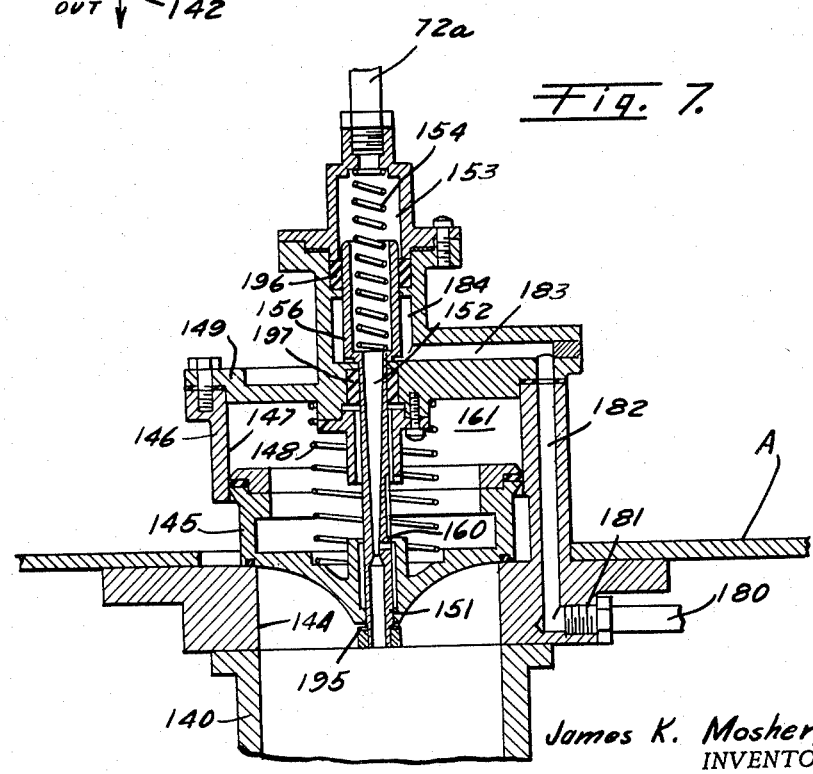
FIG. 7 is a fragmentary sectional view taken through the main valve through which liquid is delivered to or withdrawn from the tank.

In the form of the invention as shown in FIGS. 6 and 7, there is a fuel tank A in which the inlet B and outlet C are combined. There is the vent D and also the precheck E which elements function in combination the same as in the first form of my invention.

As shown in FIG. 6, the inlet and outlet B and C is in the form of a T-fitting 140 having an inlet branch 141 and an outlet branch 142 both of which when not in use may be provided with suitable closures. The upper portion of the fitting 140 is secured to the bottom of the tank A having connection to an opening 144 which is normally closed by a valve 145. This valve 145 cooperates with a body 146 and has a portion slidable in the cylindrical portion 147 of the body 146, the valve being normally held in closed position by a spring 148. The body 146 has a cover element 149 which supports a central tube 151 having a passage 152 formed therethrough, this passage 152 being connected to a chamber 153 containing a spring 154 which normally holds the tube 151 in the position shown in FIG. 7 The upper end of this tube 151 is enlarged in diameter and provides a piston 156 the operation of which will be described shortly. The chamber 153 is connected tto a line 72a which serves the same purpose as the line 72 in FIG. 1. When there is no flow of liquid through the line 72a, liquid under pressure flowing into the lower end of the passage 152 will flow through the branch passage 160 and fill the chamber 161 above the valve 145 and the valve will be pressurally held in closed position. When the valve 43a of FIG. 6 is open, liquid will flow through the line 72a and due to the aspirator effect at the opening 160 the pressure in the chamber 161 will be reduced below the pressure below the piston valve 145 and the pressure of the liquid below the valve will force the valve upward and open it. This will permit the liquid to flow into the tank and fill it.

The construction and operation of the vent D and precheck and automatic shut off E is the same as that disclosed in the form of my invention illustrated diagrammatically in FIG. 1. The sectional view of the vent D in FIG. 1 shows the same construction as is contained within the vent D in FIG. 6 and the construction of the precheck and automatic shut off means shown in FIGS. 4 and 5 is the same as that of the element E. in FIG. 6.

As in FIG. 1, the liquid will flow through the pipe 72a, the chamber of the vent D, the line 96a, through the precheck and automatic shut off E, through the line 104a, and into the bottom of the tank whenever the valve 43a is open. By closing the valve 43a the system may be prechecked as explained in connection with the operation of the form of my invention disclosed in FIG. 1. A stopping of the flow of liquid through the pipe 72a will eliminate the aspirator action at 160 with the result that pressure will be built up in the chamber 161 and the valve 145 will be closed.

The automatic shutting off of the system in closing of the main valve is accomplished in this form of the invention in the same manner as explained heretofore.

When it is desired to unload or empty fuel from the tank A the inlet is of course closed by a suitable cover and the outlet 142 is connected to suitable receiving apparatus. A hydraulic line 180 is connected at 181 to the lower flange portion of the body 146 in communication with a passage 182 thereof which is in turn connected to the passage 183 communicating with a chamber 184 in which the lower end of the piston 156 is placed. The line 180 is connected to a tank 186 through a line 187 having a hand operated hydraulic pump 188. With a valve 189 in a branch return line 190 closed, an operation of the pump 188 will deliver hydraulic liquid under pressure through one-way valve CK to the chamber 184 and will cause the piston 156 to be moved upwardly against the action of the spring 154. The collar 195 at the lower end of the tube 151 engages and lifts the valve 145 thus opening the outlet and permitting the emptying of the tank. Proper fluid type seals at 196 and 197 retain the hydraulic fluid under pressure in the chamber 184 and maintains the sleeve or tube in its raised position until such time as the valve 189 in the return line 190 is open. When this is done, the pressure is reduced in the chamber 184 which will permit the lowering of the tube 151 and a closing of the valve 145.

From the foregoing it will be seen that this form of my invention includes the features of automatic operation and all of the protective features heretofore referred to but differs from the first form of my invention in that the main control valve is positioned within the tank and also in that but one inlet and outlet opening is provided for the tank.

The form of my invention shown in FIGS. 8 to 10 includes the tank A, the inlet B, the outlet C, the vent D and the precheck and automatic shutoff E which perform the same functions as explained in connection with FIG. 1. These parts are connected together by the same lines which are given the same number as in FIG. 1 except that the suffix b has been added. In this form of my invention, the connection fitting G, the main valve H and the control line connector J are all incorporated in one structure. FIG. 9 is a sectional view of the fuel nozzle or loading nozzle with the parts assembled and in operating position. FIG. 10 is a sectional view showing the parts separated and with the various valves closed. In FIG. 10 it will be noted that the right end of the inlet is provided with a tank section 200 of the fuel nozzle which is mounted on the inlet B and forms a part of the tank assembly. There is also a filling station portion 201 which forms a part of the filling station equipment and is permanently connected to the supply line F. It will be understood that in this form of the invention as well as in the other forms, suitable universal joints or the like which will permit ready aligning of the parts are to be provided as standard practice within the skill of those in the art.

The section 200 has a body 203 which supports a valve 204 normally held in closed position against the body by a spring 205. This valve closes the passage through the inlet B. The body also supports a valve 206 which is normally held in a closed position by means of a spring 207 so that the passage 208 which is connected to the line 72b is closed when the two parts of the fuel nozzle are disconnected.

The part 201 has a body 212 having a passage 213 normally closed by a valve 214 engageable with the seat 215. The valve 214 is mounted on a stem 217 slidably supported in a bearing 218 and having a cylinder 220 mounted at its rightward end. The cylinder 220 in turn has formed around it a piston 221 which in turn is slidable in a chamber 222, there being a spring 223 normally urging the piston 221 and all of its associated parts in a leftward direction and with the valve 214 in closed position.

A sleeve 225 is mounted on the cover 226 and projects leftwardly into the cylinder 220 as shown. This sleeve 225 has openings in which locking balls 229 are positioned and these balls are held outwardly in locking engagement with shoulders 230 of the cylinder 220 by means of a central spindle 231. When this spindle 231 is moved leftwardly relative to the sleeve 225, a reduced diameter portion 232 is moved into alignment with the balls 229 so that they may move inwardly and when they do move inwardly the cylinder 220 is unlocked relative to the sleeve 225. When this unlocking occurs, the entire assembly of the valve 214, the stem 217, the cylinder 220 and the piston 221 may move rightwardly relative to the body 212 and permit the valve 214 to be moved from its seat. The stem 231 is secured to a handle 240 having arms 241 which extend around the body 212 and are connected to a sleeve 242. The sleeve 242 is held in the position shown in FIG. 10 by means of lock balls 244 supported in openings 245 of the cylindrical member 246 threadedly secured to the body 212 as shown. These balls 244 are held in an outward locking position by means of a slidable cylindrical latch element 247 resiliently retained in the position shown in FIG. 10 by a spring 248.

When the part 201 is to be joined with the part 200 as illustrated in FIG. 9, the part 201 is manually brought into aligned position and then moved leftwardly. As this occurs, the end face 250 of the projection 251 of the body 203 engages the end of the latch element and restrains it from further leftward movement. As the other portions of the part 201 continues to be moved leftwardly, all of the parts will reach a position in which the balls 244 surround the annular groove 252 of the projection 251. At this time, the balls are free to be forced inwardly out of locking position with respect to the sleeve 242 and the operator by pushing leftwardly on the handles 241 will thereupon move the sleeve 242 relative to the other parts of the assembly and this will accomplish two things. First, it will lock the balls 244 in the annular groove 252 and thus lock the parts 200 and 201 together. It will also move the spindle 231 into the position shown in FIG. 9 and will permit the locked balls 229 to be forced inwardly so that the cylinder 220 will be released and the valve 214 and its associated parts will be free to be moved rightwardly as will be explained shortly.

When the parts 200 and 201 are being moved into their assembled position the cylindrical member 260 will be moved into the socket 261 and the projection 262 on the valve 206 will be engaged by the projection 263 on the valve 264 and both of these valves will be opened, the valve 206 being opened against the action of the spring 207 and the valve 264 being opened against the action of the spring 265. In this way the passage 208 is opened and also a passage 266 of the part 201 is likewise opened. This passage 266 is connected to a passage 267 and a passage 268 to the cylinder or chamber 222 through an opening 269. In the passage 268 is a valve 271 urged toward closed position by a spring 272. This valve 271 may be opened by a valve operating member 275, which has an exterior manually engageable handle 276. With the operator 275 in such a position that the valve 271 is closed there can be no flow of liquid through the passages leading from the chamber 222 even though the two parts are secured together as shown in FIG. 9 and at this time the valves 204 and 214 will still be in closed position. However, if the valve 271 is open at the time of connection, or if the handle 276 is operated so that the valve 271 will be opened, the operation which occurs will be as follows:

There is an opening 280 connected to the main passage 213 which permits fluid under pressure to flow through the passage 281 and around the sleeve 225 through the small annular space which exists within the inwardly projecting flange 283 of the cylinder 220. This will fill the chamber 222 and hydraulically hold the parts in the position shown in FIG. 10 so that the valve 214 will remain closed.

However, upon connecting parts 200 and 201 and opening the valve 271 liquid can then flow from the chamber 222 through the passages 269, 268, 267, 266, and into the passage 208 of the part 200. From thence the liquid flows through the line 72b where it is directed through the vent D and precheck and automatic shut off E, to perform the functions previously explained. The bleeding of liquid from the chamber 222 reduces the pressure therein with the result that the pressure of the liquid on the left side of the piston 221 moves the piston and its associated parts into the position shown in FIG. 9 wherein the valve 214 is in open position. As this occurs the liquid under pressure forces the valve 204 into its open position and the fuel will flow through the inlet B into the tank A.

The opening of the vent 93b is accomplished as in the first form of my invention and a precheck of the operation may be accomplished by closing the valve 43b in the line 104b as is explained in connection with FIG. 1. When this occurs the flow of liquid out of the chamber 222 will be arrested, pressure will build up and the valve 214 will be closed. Opening the valve 43b allows the liquid to flow from the chamber 222 and the parts then move into the positions shown in FIG. 9 and the filling of the tank will continue.

As in the first form of our invention when the fluid level reaches a point where the float in the assembly E will be raised sufficiently the flow of liquid from the chamber 222 will be stopped and at that time the valves will be closed.

The operator may then disconnect the fuel nozzle by reversing the steps previously explained and this operation will result first in a rightward movement of the handle 241 before any other of the parts move. This will cause the sleeve 242 to be moved to the right and will also cause the spindle 231 to be moved to the right thus forcing the balls 229 in locking position. When the sleeve 242 has been moved to the right the balls 244 may be forced outwardly from the annular groove 252 and the two bodies may be separated from each other. As they are separated the spring 248 holds the latch element 247 from movement until the balls 242 move into a position surrounding the sleeve at which time the balls are then held in a locking position which prevents opening of the valve 214 until such time as the part 201 is assembled on a part 200 and the latch element 247 moved to its retracted and releasing position as previously explained.

This form of my invention incorporates all of the features and advantages referred to heretofore. In this form the various connecting elements between the tank structure and the filling station equipment are incorporated in a single assembly.

FIGS. 11 to 13 illustrate a fourth form of my invention in which there is a tank A, having an inlet B, and outlet C, a vent D, a precheck, and automatic shut-off element E', a supply line F, a connection fitting G, and a main valve H. The element E' is slightly modified from the element E, as employed in the other three forms of my invention. The main valve H is positioned in the tank A rather than in the supply line F. The connecting fitting G may be of any standard form and may, for example, correspond to the fitting shown in FIG. 1.

The main valve H includes a body 300 secured to the bottom wall of the tank A. This body 300 has a cylindrical chamber or cylinder 301 in which a main valve 302 is operable, said main valve being yieldably urged toward closed position by a spring 303. The cover 305 of the body 300 has a depending stem 306, which projects into an opening 307 in the lower central part of the valve 302, and this stem 306 has a central passage 308 in communication with the liquid under pressure below the valve. The passage 308 is connected by a passage 309 through an aspirator 310 to the line 72c, which leads to the vent D. The aspirator 310, as shown, includes a Venturi tube 311 as in other forms of the invention, and the passage through the Venturi is connected by small openings 312 through a passage 313 to a valve chamber 314. The valve chamber 314 has positioned in it a piston 316, which is normally urged by a spring 317 to hold a valve 318 in a position to close an outlet opening 319. When the valve 318 is in open position (not shown) the opening 319 is connected to the chamber 321 above the piston 316, which chamber 321 is connected by the opening 322, shown in dotted lines in FIG. 12, to the main chamber 301 of the body 300.

When the parts are in assembled position and the filling operation is to be performed the valves of the connection G are opened and liquid flows upwardly and through the passage 308, 309, the aspirator 310, through the line 72c, the vent D, and the line 96c, to the precheck and automatic shut off element E'. With the valve 330 open the liquid will flow through the drain pipe 109c to the bottom of the tank A. With this full flow of liquid through these various passages and lines, the aspirator will pull the piston 316 downwardly in FIG. 13, removing the valve 318 from closed position. At this time the chamber 301 will then be in open communication with the tank and the main valve 302 will be forced upwardly into open position so that the fuel may flow through the opening 331 below energy reducing shroud 332 into the tank.

As in the other forms of the invention, the vent D is automatically operated to open the vent valve 93c. When it is desired to precheck the operation of the parts this is done by opening valve 335 in line 336, which is connected to the pressure side of the inlet B and is also connected to the bottom of the float chamber 102c. Liquid under pressure flows into the float chamber and as the level rises therein the float 110c will be lifted and the valve 330 will be moved to closed position thus shutting off the flow of liquid through the line 96c. This will stop the flow of liquid through the aspirator and pressure will then build up in the chamber 314 causing the piston 316 to move in a direction to close the valve 318. With the outlet opening 318 closed liquid will then flow through the space indicated at 337, in FIG. 12, around the lower end of the stem 306. Pressure will build up in the chamber 301 and the valve 302 will be moved into closed position. Any overflow from the float chamber 102c will pass over the weir 107c and through the branch line 340 which connects to the drain line 109c.

When the precheck has been completed the valve 335 will be closed, the liquid in the float chamber 102c will drain therefrom through a small bleed 341, which connects to the line 340, whereupon the float 110c will drop opening the valve 330 and this will, in turn, cause an opening of the main valve 302 as previously explained.

This form of the invention includes the various features and advantages previously pointed out.

From the foregoing description it will be apparent that the essential features of the method and apparatus of my invention may be contained in various embodiments; and it is, therefore, desired that the scope of the invention be determined by the following claims.

I claim:

1. In combination: a tank having an inlet; a pressure operated control valve for controlling the flow of liquid through said inlet; means connected between said control valve and said tank for preventing the opening of said control valve except when it is connected to supply fluid through said inlet into said tank; and vent means for said tank connected to said last means by conduit means, said vent means being automatically operable by a predetermined fluid pressure to vent said tank whenever said control valve is open.

2. In combination: a tank having an inlet; a pressure operated control valve for controlling the flow of liquid through said inlet; means connected between said control valve and said tank for preventing the opening of said control valve except when it is connected to supply fluid through said inlet into said tank; liquid pressure operated shutoff means associated with said tank for closing said control valve when a predetermined liquid level is in said tank; and liquid pressure operated precheck means including means within said shutoff means to check the operation of said control valve and said shutoff means.

3. In combination: a tank having an inlet; a control valve for controlling the flow of liquid through said inlet, said control valve including a pressure chamber connected through a line to said tank; a second valve for closing said line whereby a pressure will be built up in said pressure chamber to force said control valve into closed position; and a vent in said line automatically operable whenever liquid is flowing therethrough, to vent said tank.

4. In combination: a tank having an inlet; a control valve for controlling the flow of liquid through said inlet, said control valve including a pressure chamber connected through a line to said tank; a second valve for closing said line whereby a pressure will be built up in said pressure chamber to force said control valve into closed position; a vent in said line automatically operable whenever liquid in flowing therethrough, to vent said tank; and means connected in said line within said tank whereby the flow of liquid through said line is closed off when the liquid level in said tank reaches a predetermined level.

5. In combination: a tank having an inlet; a pressure operated control valve for controlling the flow of liquid through said inlet; means connected between said control valve and said tank for preventing the opening of said control valve except when it is connected to supply fluid through said inlet into said tank; and pressure operated vent means for said tank connected to said last means automatically operable by liquid pressure through said valve to vent said tank whenever said control valve is open, means tending to close said vent means, said vent means having a balancing means therein to permit said last means to close said vent means when said control valve is closed.

6. In combination: a tank having an inlet; a pressure operated control valve for controlling the flow of liquid through said inlet; means connected between said control valve and said tank for preventing the opening of said control valve except when it is connected to supply fluid through said inlet into said tank; fluid pressure operated precheck means connected to said last means and in said tank whereby the operation of said control valve may be checked at any time; and vent means for said tank connected to said precheck means and to said means connected between said valve and said tank whereby said vent means may be closed when the operation of said control valve is checked.

7. In combination: a tank having an inlet; a pressure operated control valve for controlling the flow of liquid through said inlet; means connected between said control valve and said tank for preventing the opening of said control valve except when it is connected to supply fluid through said inlet into said tank; means including fluid pressure operated shutoff means for automatically closing said control valve when said tank is filled to the desired level; means whereby the operation of said shut off means and said control valve may be prechecked at any time during the filling operation; vent means for said tank connected to said precheck means; and means within said vent means for closing the latter when the operation of said control valve is checked.

8. In combination: a tank having an inlet; a control valve for controlling the flow of liquid through said inlet, said control valve including a pressure chamber connected through a line to said tank; a second valve for closing said line whereby a pressure will be built up in said pressure chamber to force said control valve into closed position; and a vent in said line automatically operable whenever liquid is flowing therethrough, to vent said tank, said vent being automatically closed when fluid is not flowing through said line.

9. In combination: a tank having an inlet; a control valve for controlling the flow of liquid through said inlet, said control valve including a pressure chamber connected through a line to said tank; a second valve for closing said line whereby a pressure will be built up in said pressure chamber to force said control valve into closed position; a vent in said line automatically operable whenever liquid is flowing therethrough, to vent said tank; and means connected in said line within said tank whereby the flow of liquid through said line is closed off when the liquid level in said tank reaches a predetermined level, said vent being automatically closed when fluid is not flowing through said line.

10. In combination: a tank having an inlet; a pressure operated control valve for controlling the flow of liquid through said inlet; means connecting said control valve to said inlet; means associated with said tank and said control valve including fluid pressure operated shutoff means for automatically closing said control valve when said tank is filled to the desired level; means whereby the operation of said shutoff means and said control valve may be prechecked at any time during the filling operation; vent means for said tank connected to said precheck means; and means within said vent means for closing the latter when the operation of said control valve is checked.

References Cited in the file of this patent

UNITED STATES PATENTS

| | | |
|---|---|---|
| 2,384,628 | Krone et al. | Sept. 11, 1945 |
| 2,417,994 | Sheets | Mar. 25, 1947 |
| 2,532,123 | Shafer | Nov. 28, 1950 |
| 2,588,869 | Pinaire | Mar. 11, 1952 |
| 2,638,916 | Scheiwer | May 19, 1953 |
| 2,712,828 | Badger | July 12, 1955 |
| 2,780,237 | Russell | Feb. 5, 1957 |
| 2,869,594 | Bisgard et al. | Jan. 20, 1959 |
| 2,884,964 | Tye | May 5, 1959 |
| 2,947,330 | Savage | Aug. 2, 1960 |
| 2,948,307 | Rittenhouse et al. | Aug. 9, 1960 |
| 2,996,222 | Botkin | Aug. 15, 1961 |

FOREIGN PATENTS

| | | |
|---|---|---|
| 101,546 | Australia | July 7, 1937 |